Figure 3:
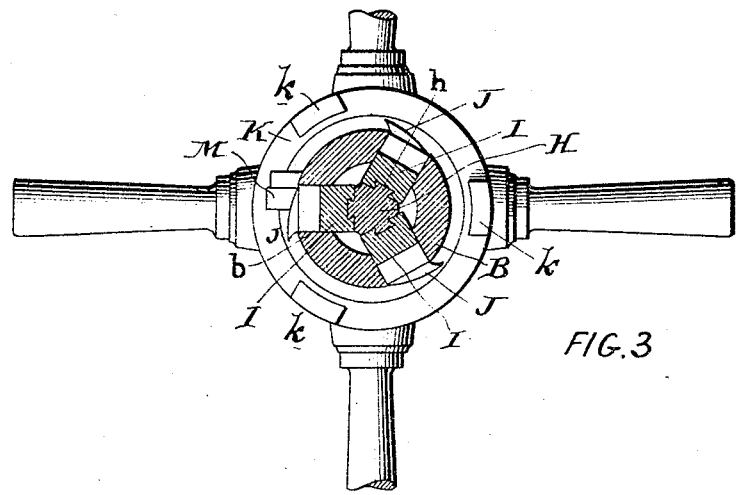

No. 784,578. PATENTED MAR. 14, 1905.
L. D. LOVEKIN.
TOOL FOR EXPANDING AND CUTTING PIPE.
APPLICATION FILED FEB. 25, 1904.

5 SHEETS—SHEET 1.

WITNESSES:
P. M. Kelly.
M. J. Eyrie.

INVENTOR
Luther D. Lovekin
BY
[signature]
ATTORNEY.

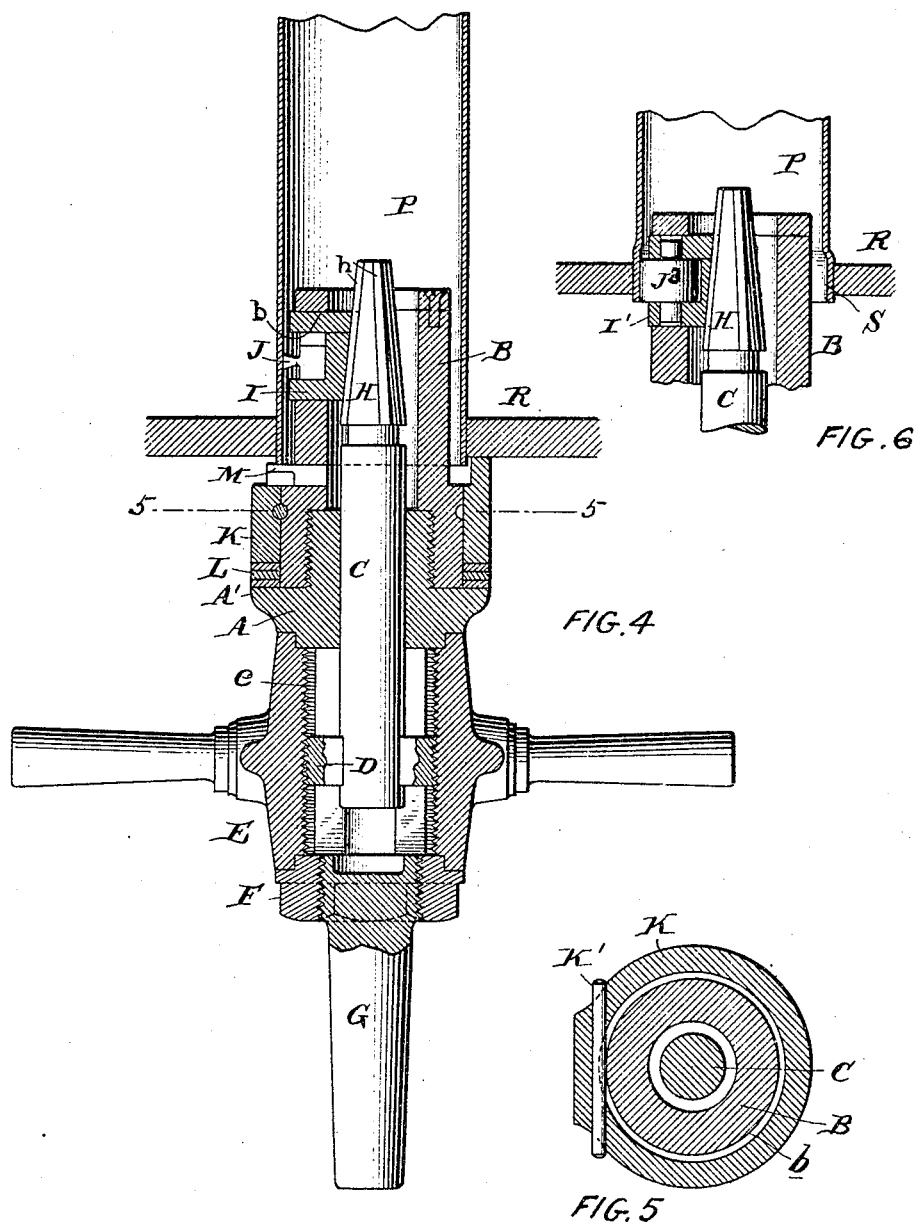

No. 784,578. PATENTED MAR. 14, 1905.
L. D. LOVEKIN.
TOOL FOR EXPANDING AND CUTTING PIPE.
APPLICATION FILED FEB. 25, 1904.

5 SHEETS—SHEET 3.

WITNESSES:
INVENTOR
Luther D. Lovekin
BY
ATTORNEY.

No. 784,578. PATENTED MAR. 14, 1905.
L. D. LOVEKIN.
TOOL FOR EXPANDING AND CUTTING PIPE.
APPLICATION FILED FEB. 25, 1904.

5 SHEETS—SHEET 4.

WITNESSES:
INVENTOR
Luther D. Lovekin
BY
ATTORNEY.

No. 784,578. PATENTED MAR. 14, 1905.
L. D. LOVEKIN.
TOOL FOR EXPANDING AND CUTTING PIPE.
APPLICATION FILED FEB. 25, 1904.
5 SHEETS—SHEET 5.
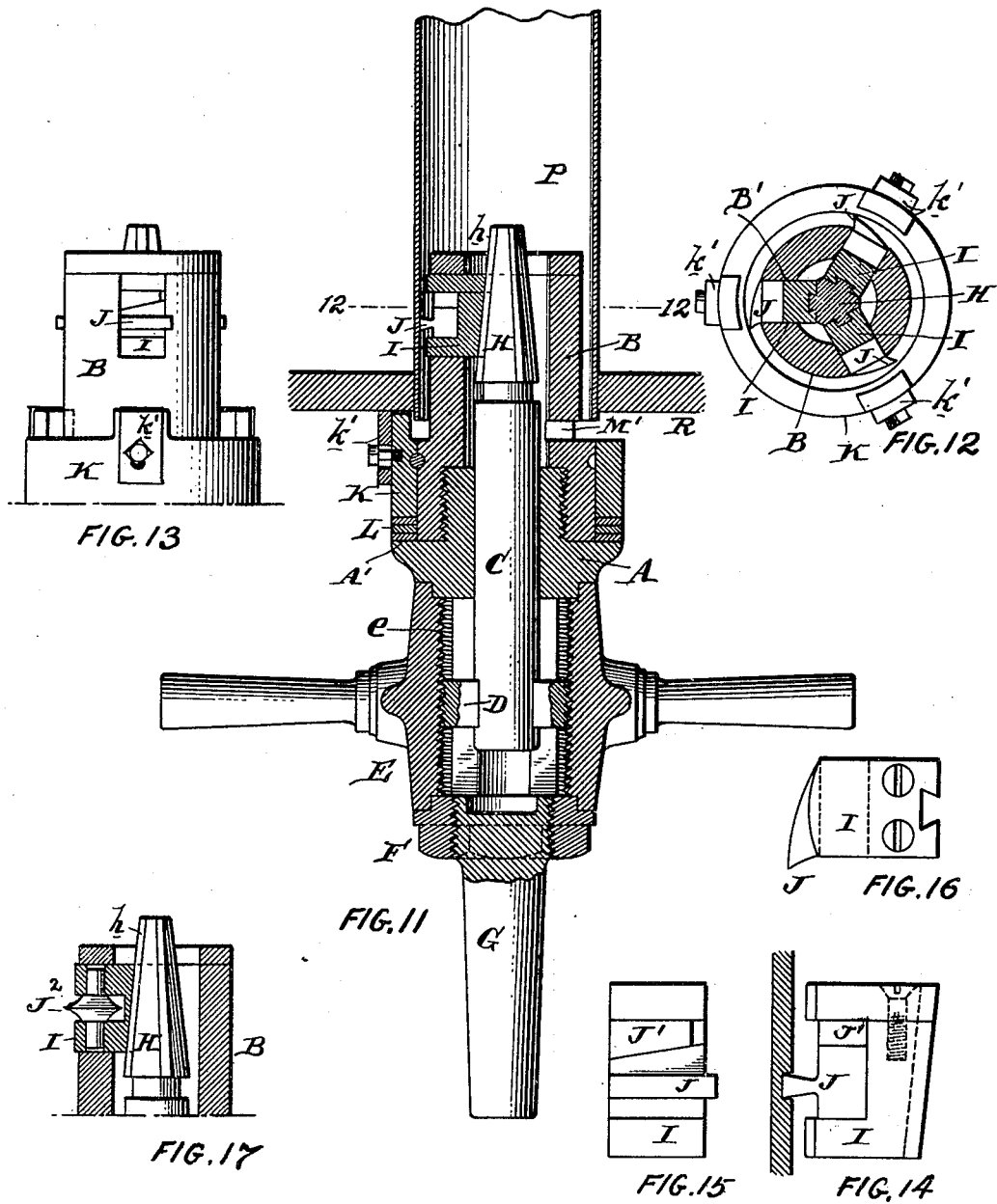

No. 784,578. Patented March 14, 1905.

UNITED STATES PATENT OFFICE.

LUTHER D. LOVEKIN, OF PHILADELPHIA, PENNSYLVANIA.

TOOL FOR EXPANDING AND CUTTING PIPE.

SPECIFICATION forming part of Letters Patent No. 784,578, dated March 14, 1905.

Application filed February 25, 1904. Serial No. 195,233.

*To all whom it may concern:*

Be it known that I, LUTHER DANIEL LOVEKIN, of the city and county of Philadelphia, State of Pennsylvania, have invented an Improvement in Tools for Expanding and Cutting Pipe, of which the following is a specification.

My invention has reference to tools for expanding and cutting pipe; and it consists of certain improvements which are fully set forth in the following specification and shown in the accompanying drawings, which form a part thereof.

The object of my invention is to provide a construction of tool which shall be adapted to expand and trim the outer edge of the pipe, whereby it may be subsequently upset or flanged by a secondary tool.

My object is, further, to so arrange the parts which produce the expanding operation that they may be modified by introducing cutters into the places of the expanding-rollers for the purpose of cutting through the body of the tube beyond its expanded portion when for any cause it is necessary to remove the tube.

In carrying out my invention I provide a mandrel the end of which is recessed and furnished with carriages having expanding-rolls or cutting devices, as required for the particular use of the tool. The mandrel is further provided with a follower-shaft, which is adjustable longitudinally and has a tapered end and combined with the carriages in such a manner as to impart to them lateral movement during the rotation of the mandrel. The mandrel is also combined with a trimming-cutter extending radially and a pressure-shoe adapted to press upon the plate in which the tube is to be expanded or upset and in which shoe the mandrel is rotatable and by which it is held at the requisite distance within the tube to insure the proper trimming of the tube end and location of the cutting-off cutters.

My invention also includes details of construction which, together with the above-specified features, will be better understood by reference to the drawings, in which—

Figure 2:
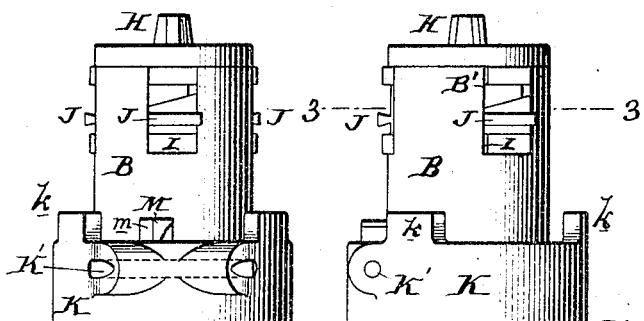
Figure 1:
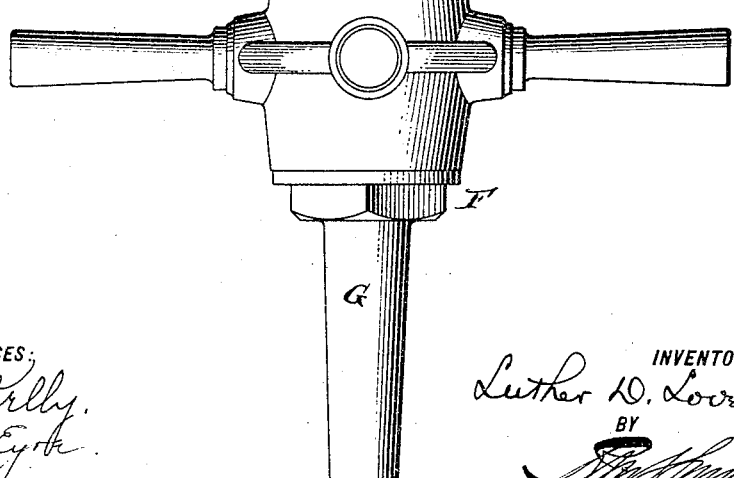
Figure 8:
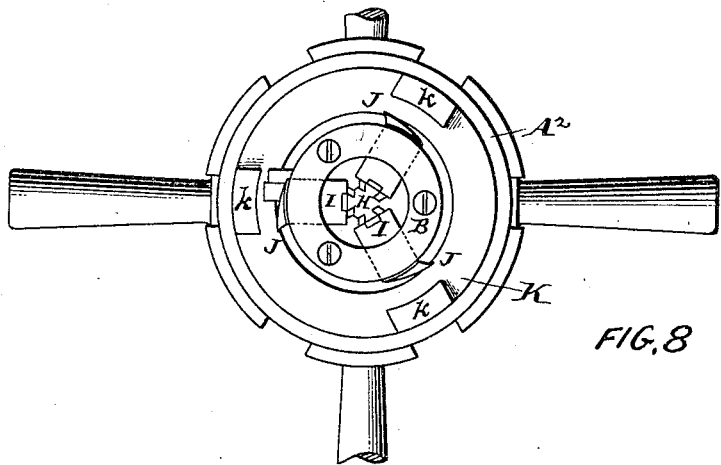
Figure 7:
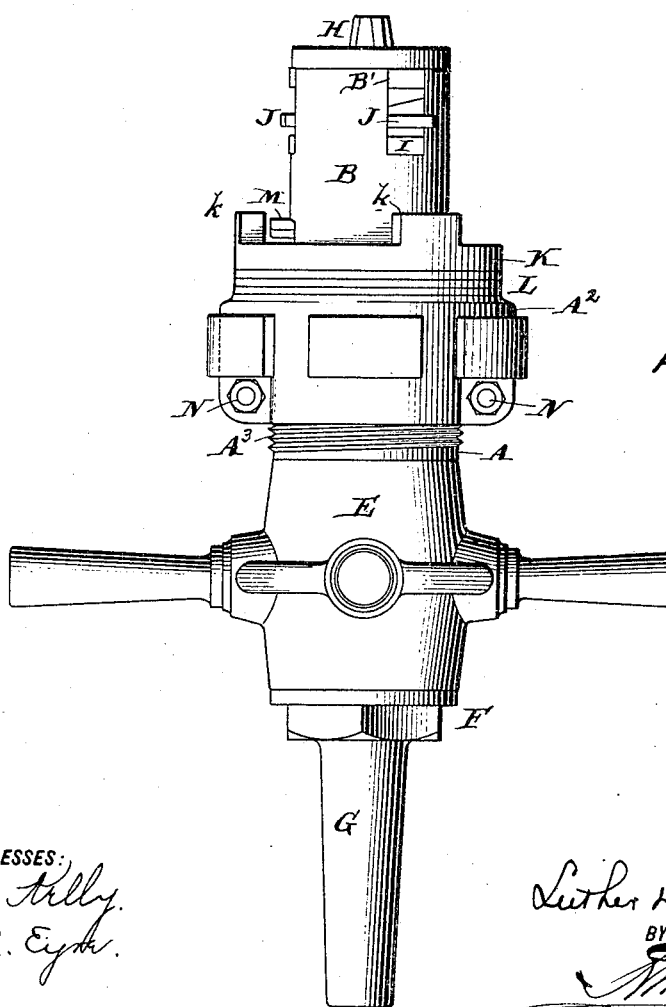
Figures 9, 10:
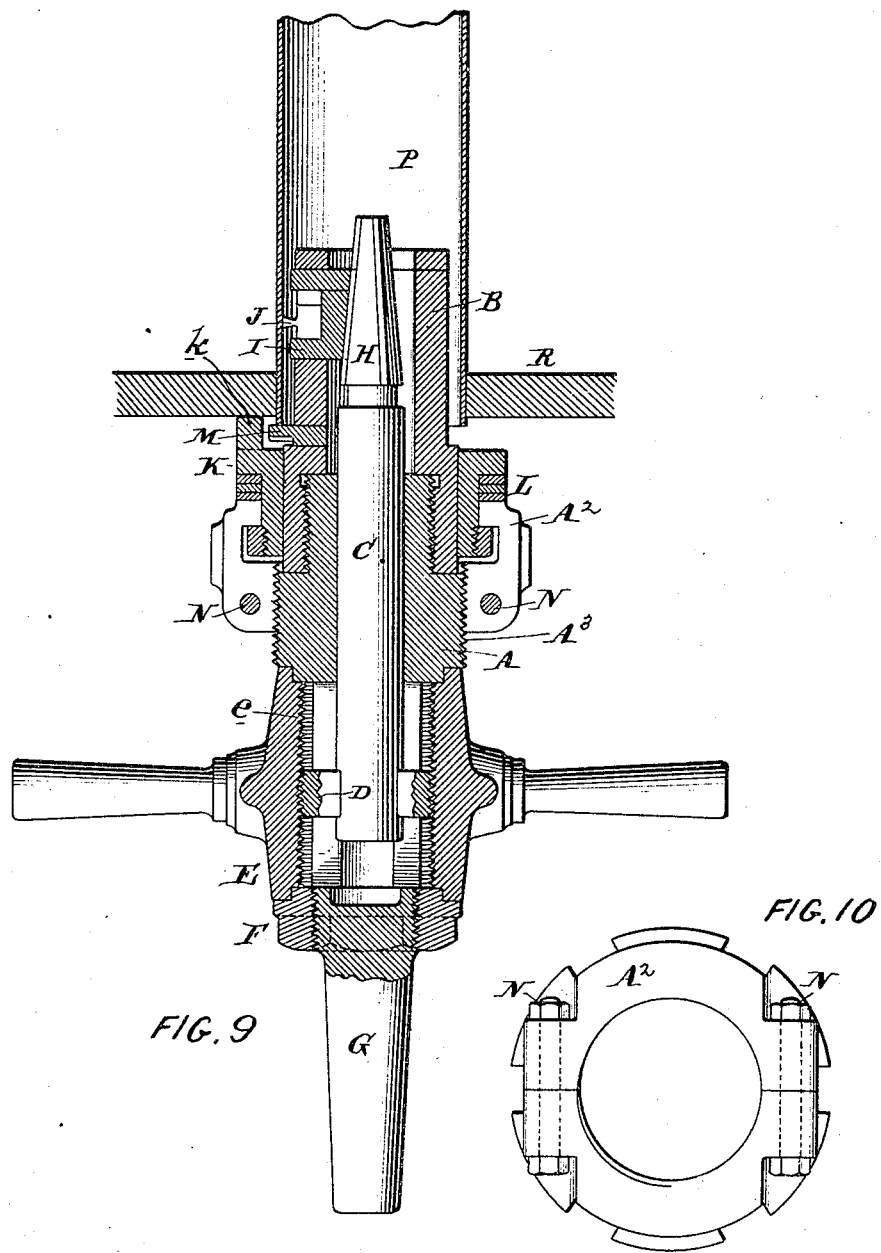

Figure 1 is an elevation of an expanding and cutting tool embodying my invention. Fig. 2 is an elevation of the end of same, taken from another point of view. Fig. 3 is a cross-section of same on line 3 3 of Fig. 1. Fig. 4 is a longitudinal sectional elevation of the tool shown in Fig. 1. Fig. 5 is a cross-section of same on line 5 5 of Fig. 4. Fig. 6 is a sectional view with the expanding-rolls substituted for the cutters shown in Fig. 4. Fig. 7 is an elevation of a modified form of my improved tool. Fig. 8 is an end view of the same. Fig. 9 is a longitudinal sectional view of the same. Fig. 10 is a plan view of the shoe-adjusting ring. Fig. 11 is a longitudinal sectional view of my tool, showing other modifications. Fig. 12 is a cross-section of same on line 12 12. Fig. 13 is an elevation of the end of same. Figs. 14, 15, and 16 are elevations and plan of the cutting-off cutter and its carriage, and Fig. 17 is a section showing another form of cutting-off cutter applied to the mandrel.

A is the body of the tool, and B is the mandrel thereof. The lower end of the mandrel is provided with radial apertures B', in which are guided carriages I, fitted with cutting-off cutters J. These carriages I are connected at their inner ends with the end H of the follower-shaft C, the connection being an inclined sliding tongue-and-groove union, as at $h$, so that the longitudinal adjustment of the follower-shaft causes the cutters to be moved radially to or from the center of the mandrel, as will be readily understood by reference to the drawings. These cutters J are held in the carriages by wedges J', as shown more fully in Fig. 15. When used for cutting off tubes, the end of the tool is inserted into the tube P, as shown in Fig. 4, so that the cutters J operate upon the inside of the tube at a short distance beyond the boiler-head R. As the cutting proceeds the follower-shaft is fed forward and the carriages I and cutters J extended, so as to continue the cutting.

If desired, the cutters J may be substituted by wheel-cutters $J^2$, as shown in Fig. 17.

When the tool is employed for expanding tubes in boiler-heads or pipe-flanges, the end of the mandrel B is fitted with rollers $J^3$ and carriages I', as shown in Fig. 6, in place of the parts J and I used for cutting off old boiler-tubes, these parts being readily interchangeable. When the expanding-rollers are employed, the pipe P is expanded, as shown in Fig. 6, and the end is also trimmed, as in Fig. 4. In this shape it is ready for beading to complete the securing of the tube in place. The tool is thus adapted for use in securing boiler-tubes in place and also for removing old or defective tubes by cutting them off just inside of the boiler-head.

The follower-shaft at its upper end is fitted with a transverse key D, guided in a suitable slotted aperture in the body A and adapted to engage with an internal screw-thread $e$ of the control-ring E, which is furnished with arms or other projecting part whereby to grasp and hold it to cause the proper adjustment of the follower-shaft C during the rotation of the tool. This control-ring E is journaled between the body A and a nut F, screwed upon the shank G of the body. The shank G is adapted to be received and held by the tailstock of a lathe or other suitable machine while the tube is rotated, or, conversely, the tool may be rotated and the tube held stationary, as preferred or as the work may necessitate. The tool may be rotated by hand, if so desired.

M is a trimming-cutter of steel and is set radially in the mandrel, as shown. The object of this cutter is to trim the end of the tube P when it projects beyond the plate or flange R, whereby only sufficient of the tube end shall remain to make the proper flanged or upset finish. To limit the cutting action of the cutter M, I provide a shoe-ring K, having three or more feet or other parts $k$ extending beyond the cutter, which shall hold the mandrel from entering too far into the tube. In this manner the extent to which the cutter N can approach the plate R, through which the tube extends, is restricted, and hence a sufficient extension of the tube is left after trimming to insure the proper flanging or beading, as the case may be, by the use of suitable tools for producing such flange or bead. The shoe remains stationary while the mandrel and cutter rotate, and to insure the friction between the shoe K and flange A' of the body A being reduced to a minimum I employ one or more annular antifriction-rings L, as shown. The cutter M may be secured in the mandrel in any suitable manner, that shown being the arrangement of the cutter radially in a slot and securing it in place by a wedge $m$. To prevent the shoe-ring K from falling off the mandrel, I may provide the latter with an annular groove $b$, in which a pin K' in the shoe projects, as shown in Figs. 4 and 5.

In the case where the tube rotates then the shoe rotates with it and the mandrel remains stationary.

The shoe K in the above constructions was not adjustable, and hence the extent of projection of the trimmed end of the tube was fixed. This may be varied by providing the shoe K with adjustable feet $k'$, as shown in Figs. 11, 12, and 13. In Fig. 11 the trimming-cutter M has been removed from its transverse socket M'.

Another mode of securing the adjustment to the shoe K is shown in Figs. 7 to 10. In this case the shoe K rests against an adjustable collar $A^2$, preferably with the interposed antifriction-rings L. The collar $A^2$ is screwed upon the threaded portion $A^3$ of the body A, so as to be longitudinally adjustable thereon, and may be secured and clamped in adjusted position by being split and tightened by the bolts N. By the adjustment of this collar the shoe may be made to extend a greater or less distance beyond the trimming-cutter M, and consequently increases or decreases the extent of projection of the pipe beyond the boiler-head.

While I prefer the construction shown, I do not limit myself to the minor details, as they may be modified in various ways without departing from the spirit of my invention.

Having now described and ascertained the nature of my said invention, what I claim as new, and desire to secure by Letters Patent, is—

1. In a tool for expanding and trimming pipe, a mandrel adapted to enter the pipe, combined with a rigid trimming-cutter extending laterally from the body of the mandrel at a distance from the end of the mandrel, and a shoe encircling the mandrel and extending above and below the trimming-cutter and rotatable relatively to the mandrel whereby the shoe restricts the extent of trimming of the end of the expanded pipe.

2. In a tool for trimming the ends of expanded tubes, a mandrel having a rigid trimming-cutter extending laterally from the body of the mandrel and in which the mandrel has an annular shoulder above the cutter, in combination with a shoe encircling the mandrel and extending beyond the cutter to limit the extent of the trimming of the end of the tube, and antifriction annular rings interposed between the shoulder of the mandrel and shoe.

3. A tool for cutting off expanded tubes consisting of a mandrel combined with radially-adjustable carriages in its end provided with cutting-off cutters, a longitudinally-adjustable follower-shaft for adjusting the carriages radially in the mandrel, a split collar screwed upon the outside of the mandrel-body so as to be longitudinally adjustable, means to clamp the parts of the split collar together upon the mandrel, and a shoe rotatably supported by the split collar and encircling the mandrel to limit the extent to which it enters the tube so as to insure the cutters to rotate in the same plane and continuously operate upon the same part of the tube.

4. In a tool for expanding and trimming pipe, a mandrel adapted to extend into the pipe, combined with a rigid trimming-cutter extending laterally from the body of the mandrel at a distance from the end of the mandrel, a shoe encircling the mandrel and extending above and below the trimming-cutter and rotatable relatively to the mandrel whereby the shoe restricts the extent of trimming of the end of the expanded pipe, and means for adjusting the end of the shoe to a greater or less distance beyond the trimming-cutter to vary the length of projecting end of the tube above the boiler-head.

5. In a tool for expanding and trimming pipe, a mandrel adapted to extend into the pipe, combined with a rigid trimming-cutter extending laterally from the body of the mandrel at a distance from the end of the mandrel, a shoe encircling the mandrel and extending above and below the trimming-cutter and rotatable relatively to the mandrel whereby the shoe restricts the extent of trimming of the end of the expanded pipe, and means for adjusting the end of the shoe to a greater or less distance beyond the trimming-cutter to vary the length of the projecting end of the tube above the boiler-head, consisting of an adjustable collar carried by the mandrel-body and provided with a shoulder against which the shoe rests.

6. A tool for cutting off expanded tubes consisting of a mandrel combined with radially-adjustable carriages I, a longitudinally-adjustable follower-shaft for adjusting the carriages radially in the mandrel, cutters J held in the carriages, and clamping-wedges J' for locking the cutters in the carriages.

In testimony of which invention I hereunto set my hand.

LUTHER D. LOVEKIN.

Witnesses:
R. M. HUNTER,
R. M. KELLY.